(12) United States Patent
Zhang et al.

(10) Patent No.: US 10,528,091 B2
(45) Date of Patent: Jan. 7, 2020

(54) ELECTRONIC DEVICE

(71) Applicant: GUANGDONG OPPO MOBILE TELECOMMUNICATIONS CORP., LTD., Dongguan, Guangdong (CN)

(72) Inventors: Haiping Zhang, Guangdong (CN); Yibao Zhou, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/128,881

(22) Filed: Sep. 12, 2018

(65) Prior Publication Data

US 2019/0155345 A1    May 23, 2019

(30) Foreign Application Priority Data

Nov. 22, 2017  (CN) .......................... 2017 1 1174615

(51) Int. Cl.
*G06F 1/16*  (2006.01)

(52) U.S. Cl.
CPC .......... *G06F 1/1684* (2013.01); *G06F 1/1626* (2013.01); *G06F 1/1637* (2013.01); *G06F 2200/1631* (2013.01)

(58) Field of Classification Search
CPC .... G06F 1/1626; G06F 1/1637; G06F 1/1684; G06F 1/1686; G06F 1/1688; G06F 1/1694; G06F 1/1698; G06F 2200/1631
See application file for complete search history.

(56) References Cited

U.S. PATENT DOCUMENTS

| | | | | |
|---|---|---|---|---|
| 2008/0158173 | A1* | 7/2008 | Hamblin | G06F 1/1626 345/173 |
| 2012/0132788 | A1* | 5/2012 | Findlay | G01J 1/0219 250/208.2 |
| 2013/0093731 | A1* | 4/2013 | Scharff | G06F 3/0436 345/177 |
| 2014/0354591 | A1* | 12/2014 | Chu | G06F 3/044 345/174 |
| 2015/0378592 | A1* | 12/2015 | Kim | G06F 1/1626 715/765 |

(Continued)

FOREIGN PATENT DOCUMENTS

| | | |
|---|---|---|
| CN | 106371513 | 2/2017 |
| CN | 106375606 | 2/2017 |

(Continued)

OTHER PUBLICATIONS

WIPO, English Translation of ISR/WO for PCT/CN2018/109084, Nov. 15, 2018.

(Continued)

*Primary Examiner* — Gene W Lee
(74) *Attorney, Agent, or Firm* — Hodgson Russ LLP

(57) ABSTRACT

An electronic device is provided. The electronic device includes a display screen, a sensor component and a light shield layer. The display screen has a straight portion and a curved portion extending from a side of the straight portion. The sensor component is opposite to the display screen and has a position corresponding to the curved portion of the display screen. The light shield layer is arranged at a side of the display screen facing the sensor component.

13 Claims, 4 Drawing Sheets

(56) References Cited

U.S. PATENT DOCUMENTS

| | | | |
|---|---|---|---|
| 2016/0227317 A1* | 8/2016 | Landau | G06F 1/1684 |
| 2017/0202096 A1 | 7/2017 | Park et al. | |
| 2017/0212613 A1 | 7/2017 | Hwang et al. | |
| 2018/0150153 A1* | 5/2018 | Yoon | G06F 3/041 |
| 2018/0307270 A1* | 10/2018 | Pantel | G06F 1/1637 |

FOREIGN PATENT DOCUMENTS

| | | |
|---|---|---|
| CN | 106453726 | 2/2017 |
| CN | 106774653 | 5/2017 |
| CN | 106774656 | 5/2017 |
| CN | 106850101 | 6/2017 |
| CN | 106850982 | 6/2017 |
| CN | 106850990 | 6/2017 |
| CN | 106940633 | 7/2017 |
| CN | 206370853 | 8/2017 |
| CN | 206441049 | 8/2017 |
| CN | 107135290 | 9/2017 |
| CN | 206489474 | 9/2017 |
| CN | 107300417 | 10/2017 |
| CN | 108008765 | 5/2018 |
| WO | 2013184375 | 12/2013 |

OTHER PUBLICATIONS

EPO, Office Action for EP Application No. 18198154, dated Apr. 12, 2019.
SIPO, First Office Action for CN Application No. 201711174615, dated May 28, 2019.

* cited by examiner

ELECTRONIC DEVICE

CROSS-REFERENCE TO RELATED APPLICATIONS

This application is based upon and claims priority to Chinese Patent Application No. 201711174615.6, filed on Nov. 22, 2017, the entire content of which is incorporated herein by reference.

FIELD

The present disclosure relates to an electronic device.

BACKGROUND

With developments of communication technology, the electronic device (such as the smart phone) is more and more popular. In a process of using the electronic device, for example during a call, in order to avoid the user's misoperations of the electronic device, when the user's face approaches the electronic device to a certain distance, the display screen of the electronic device will go out automatically. Generally, the electronic device detects the approach and departure of the user's face by the proximity sensor, and the display screen of the electronic device is controlled to go out or light up according to the detected data.

Also, with developments of mobile Internet technology, the information safety and the identity authentication in the smart mobile terminal become increasingly outstanding, and more and more smart terminals are integrated with sensors of biometric identification technology for identifying the biological information, such as the fingerprint, the human face and the iris. In addition, the ambient-light sensor, the distance sensor or the like is needed, and these sensors generally are arranged in the front panel of the terminal, such that a large area is occupied, thus taking up the insufficient available space in the front panel of the phone, and hence causing a small screen-to-body ratio of the terminal.

SUMMARY

Embodiments of a first aspect of the present disclosure provide an electronic device. The electronic device includes a display screen having a straight portion and a curved portion extending from a side of the straight portion; a sensor component arranged opposite to the circuit board and having a position corresponding to the curved portion of the display screen; and a light shield layer arranged at a side of the display screen facing the sensor component.

Embodiments of a second aspect of the present disclosure provide another electronic device. The electronic device includes: a display screen having a straight portion and two curved portions extending from two sides of the straight portion respectively; and a sensor component arranged opposite to the display screen and including a signal emitter and a signal receiver. The signal emitter is configured to emit a detecting signal to outside through one of the two curved portions and the signal receiver is configured to receive a reflected signal from the outside through the other one of the two portions. The detecting signal is reflected into the reflected signal when touching an external object.

Embodiments of a third aspect of the present disclosure provide a further electronic device. The electronic device includes: a housing; a display screen coupled to the housing, having a straight portion and a curved portion extending from a side of the straight portion; a circuit board received in the housing and disposed at a side of the display screen; a sensor component coupled to the circuit board and arranged opposite to the curved portion of the display screen; and a light shield layer arranged between the display screen and the sensor component.

BRIEF DESCRIPTION OF THE DRAWINGS

To describe technical solutions in embodiments of the present disclosure more clearly, the following will briefly introduce the accompanying drawings required for the description of the embodiments. Obviously, the accompanying drawings described below show some embodiments of the present disclosure, and those skilled in the art can obtain other drawings based on these drawings without paying creative efforts.

DETAILED DESCRIPTION

Figure 1:
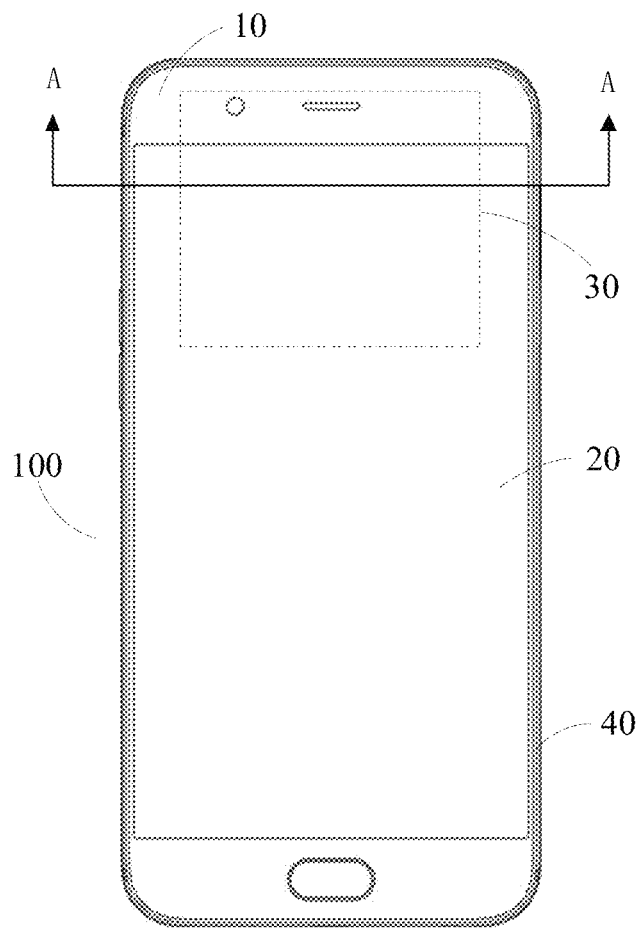
FIG. 1 is a schematic view of an electronic device according to an embodiment of the present disclosure.

Technical solutions in embodiments of the present disclosure will be clearly and completely described below with reference to the accompanying drawings in the embodiments of the present disclosure. Obviously, the embodiments described herein are only a part but not all of the embodiments of the present application. Based on the embodiments of the present disclosure, all other embodiments obtained by those skilled in the art without paying creative efforts, fall into the protection scope of the present application.

In the specification, it is to be understood that terms such as "width," "upper," "lower," "front," "rear," "top," "bottom," "inner" and "outer" should be construed to refer to the orientation as then described or as shown in the drawings under discussion. These relative terms are for convenience of description and do not require that the present disclosure be constructed or operated in a particular orientation.

The following disclosure provides many different embodiments or examples to realize different structures of the present disclosure. To simplify the disclosure of the present disclosure, components and configurations in particular examples are elaborated. Of course, they are illustrative, and are not intended to limit the present disclosure. Moreover, reference numbers and/or letters may be repeated in different examples of the present disclosure for the purpose of simplicity and clarity, which shall not be constructed to indicate the relationships among various embodiments and/or configurations. In addition, the present disclosure provides examples of various specific processes and materials, but applicability of other processes and/or utilization of other materials are conceivable for those skilled in the art.

Embodiments of the present disclosure provide an electronic device. The electronic device may be a smart phone, a tablet personal computer or the like. The electronic device includes: a housing; a display screen coupled to the housing, having a straight portion and a curved portion extending from a side of the straight portion; a circuit board received in the housing and disposed at a side of the display screen; a sensor component coupled to the circuit board and arranged opposite to the curved portion of the display screen; and a light shield layer arranged between the display screen and the sensor component.

As illustrated in FIG. 1, the electronic device 100 includes a cover plate 10, a display screen component 20, a circuit board 30 and a housing 40.

The cover plate 10 is coupled to the display screen component 20 so as to cover the display screen component 20. The cover plate 10 may a transparent glass cover plate. In some embodiments, the cover plate 10 may be a glass cover plate made of materials such as sapphire or the like.

The display screen component 20 is coupled to the housing 40 to provide a display surface of the electronic device 100. The display screen component 20 serves as a front cover of the electronic device 100 to define an enclosed space together with the housing 40, for receiving other electronic elements of the electronic device 100 therein. Also, the display screen component 20 serves as the display surface of the electronic device 100 for displaying information such as images, texts or the like.

The circuit board 30 is arranged in the housing 40, such that the circuit board 30 is received in the above enclosed space. The circuit board 30 may be a mainboard of the electronic device 100. The circuit board 30 has a ground point for grounding of the circuit board 30. The circuit board 30 may be integrated with functional components such as a camera, a processor or the like. Also, the display screen component 20 may be electronically coupled to the circuit board 30.

In some embodiments, the circuit board 30 has a display control circuit. The display control circuit outputs an electrical signal to the display screen component 20, so as to control the display screen component 20 to display information.

The housing 40 provides an external outline of the electronic device 100. The housing 40 may be made of plastics or metal. The housing 40 may be integrally molded.

In some embodiments of the present disclosure, the electronic device includes a display screen, a sensor component and a light shield layer. The display screen has a straight portion and a curved portion extending from a side of the straight portion. The sensor component is arranged opposite to the circuit board and has a position corresponding to the curved portion of the display screen. The light shield layer is arranged at a side of the display screen facing the sensor component.

Figure 2:
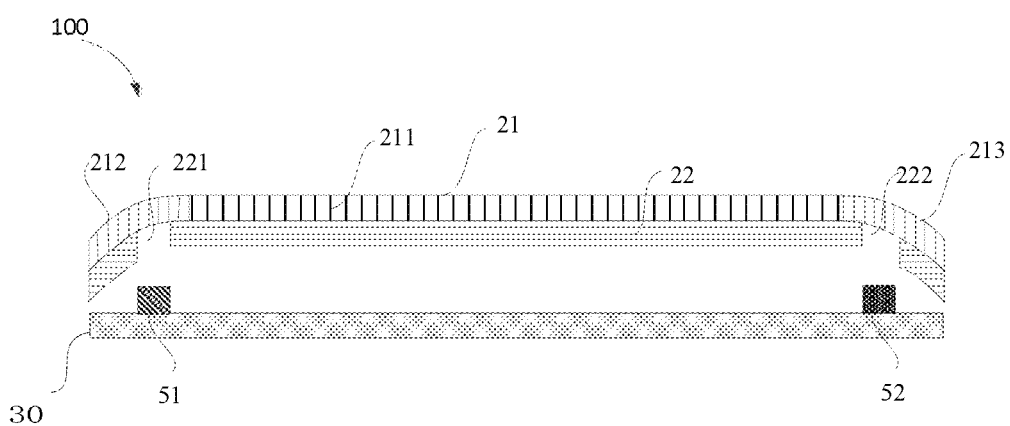
FIG. 2 is a sectional view of the electronic device along line A-A in FIG. 1, in which a display screen component, a sensor component and a circuit board are illustrated.
Figure 7:
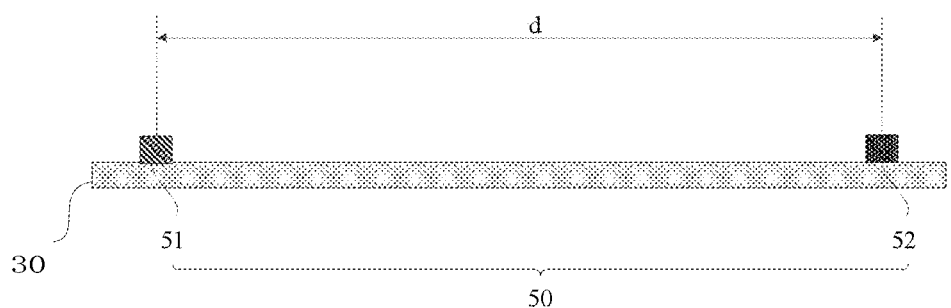
FIG. 7 is a sectional view of a sensor component and a circuit board according to an embodiment of the present disclosure.

In some embodiments, as illustrated in FIG. 2 and FIG. 7, the electronic device includes a display screen 21, a light shield layer 22, a sensor component 50 and a circuit board 30. The light shield layer 22, the sensor component 50 and the circuit board 30 are disposed at a same side of the display screen 21. The light shield layer 22 is arranged between the display screen 21 and the sensor component 50. The sensor component 50 is coupled to the circuit board 30.

It may be understood that the light shield layer 22 and the sensor component 50 are arranged at an inner side of the display screen 21. The inner side of the display screen 21 means an invisible side of the display screen 21, when observed from an exterior of the electronic device 100. That is, the light shield layer 22 and the sensor component 50 are located inside the electronic device 100.

In other words, the display screen component 20 includes the display screen 21 and the light shield layer 22 arranged at the inner side of the display screen 21, i.e. below the display screen 21 when the electronic device 100 is normally used. The light shield layer 22 is used to hide internal structures of the electronic device 100, so as to prevent a user from observing the internal electronic elements of the electronic device 100 through the display screen 21.

Embodiments of the present disclosure provide another electronic device. The electronic device includes a display screen having a straight portion and two curved portions extending from two sides of the straight portion respectively; and a sensor component arranged opposite to the display screen and including a signal emitter and a signal receiver. The signal emitter is configured to emit a detecting signal to outside through one of the two curved portions and the signal receiver is configured to receive a reflected signal from the outside through the other one of the two portions, in which the detecting signal is reflected into the reflected signal when touching an external object.

In embodiments of the present disclosure, the sensor component 50 includes a signal emitter 52 and a signal receiver 51. For example, the signal emitter 52 may an infrared LED light for emitting an infrared light. The infrared light passes through the display screen 21 and then is transmitted to the outside. The infrared light is further changed into a reflected light after being reflected by an external object, and the signal receiver 51 is used to receive the above reflected light. Both the signal emitter 52 and the signal receiver 51 may be coupled to the circuit board 30, and the circuit board 30 may be a flexible circuit board.

As illustrated in FIGS. 2, 3, 4 and 6, the display screen 21 includes a straight portion 211 and a curved portion extending from a side of the straight portion 211. The sensor component 50 has a position corresponding to the curved portion of the display screen 21.

In embodiments as illustrated in FIGS. 2, 3, 4 and 6, the curved portion includes a first curved portion 212 and a second curved portion 213. In this case, the signal emitter 52 has a position corresponding to the second curved portion 213, and the signal receiver 51 has a position corresponding to the first curved portion 212. It may be understood that the positions of the signal emitter 52 and the signal receiver 51 may be exchanged in these embodiments.

It should be noted that terms such as "first" and "second" are used herein for purposes of description and are not intended to indicate or imply relative importance or significance and are not intended to implicitly indicate the number of the technical feature mentioned. Thus, features limited by "first" and "second" are intended to indicate or imply including one or more than one these features.

In other embodiments (not illustrated), both the signal emitter 52 and the signal receiver 51 may correspond to the same curved portion. For example, both positions of the signal emitter 52 and the signal receiver 51 correspond to the first curved portion 212 or the second curved portion 213. In this case, only one curved portion is necessary and may be provided. Correspondingly, only one opening (to be described in details below) needs to be provided in the light shield layer 22, if necessary.

Figure 6:
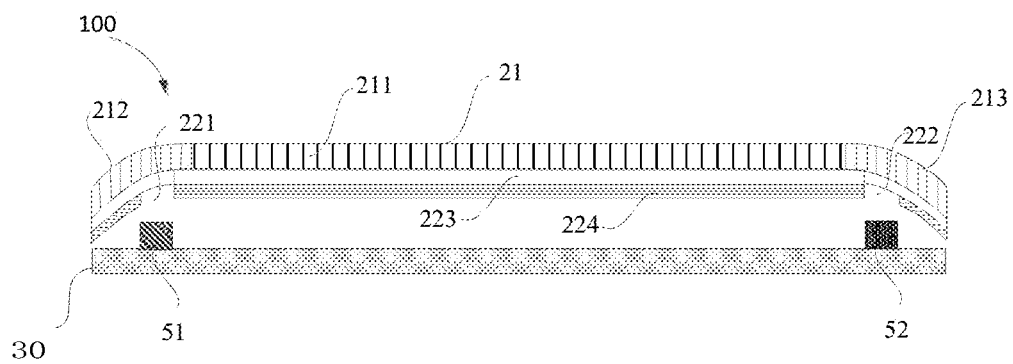
FIG. 6 is a sectional view illustrating a further variant of the electronic device in FIG. 2.

In the embodiments illustrated in FIGS. 2 and 6, the light shield layer 22 has a first opening 221 and a second opening 222. The first opening 221 has a position corresponding to the signal receiver 51, and the second opening 222 has a position corresponding to the signal emitter 52. The first opening 221 and the second opening 222 allow signals (such as optical signals and acoustical signals) to pass therethrough.

When the signal emitter 52 is arranged at the second curved portion 213 and the signal receiver 51 is arranged at the first curved portion 212, a distance between the signal emitter 52 and the signal receiver 51 is substantially equal to a body width of the electronic device. The distance between the signal emitter 52 and the signal receiver 51 is a distance between a geometric center of the signal emitter 52 and a geometric center of the signal receiver 51. Correspondingly, a distance between the first opening 221 and the second opening 222 in the light shield layer 22 is also substantially equal to the body width of the electronic device.

However, in the other embodiments, when the positions of the signal emitter 52 and the signal receiver 51 correspond to the same curved portion, for example, when the positions of the signal emitter 52 and the signal receiver 51 correspond to the first curved portion 212 or the second curved portion 213, the distance between the signal emitter 52 and the signal receiver 51 may be 2 mm-14 mm.

The signal emitter 52 is used to emit a detecting signal to the outside. The detecting signal is transmitted to the outside through the second opening 222. The detecting signal becomes into a reflected signal when touching the external object (such as a user's face). The reflected signal enters the signal receiver 51 through the first opening 221. After receiving the reflected signal, the signal receiver 51 may output the received signal to the processor of the electronic device 100 to be processed, so as to control the display screen of the electronic device 100 to go out or light up.

Since the first opening 221 and the second opening 222 are provided in the light shield layer 22, a transmittance of the signal emitted by the signal emitter 52 is improved, so as to increase a strength of the signal received by the signal receiver 51, and hence to improve a detecting accuracy of the sensor component, thus improving an accuracy of controlling the display screen of the electronic device 100 to go out or light up.

In some embodiments, the display screen 21 may be a liquid crystal display (LCD) or an organic light-emitting diode (OLED) display. When the display screen 21 is the liquid crystal display, the display screen 21 includes a backlight plate, a lower polaroid, an array substrate, a liquid crystal layer, a color film substrate and an upper polaroid which are laminated in sequence. When the display screen 21 is the organic light-emitting diode display, the display screen 21 includes a base layer, an anode, an organic layer, an electrically conductive layer, an emitting layer and a cathode which are laminated in sequence.

In some embodiments, the light shield layer 22 may be a lamellar structure made of materials such as foam or steel sheets.

Figure 3:
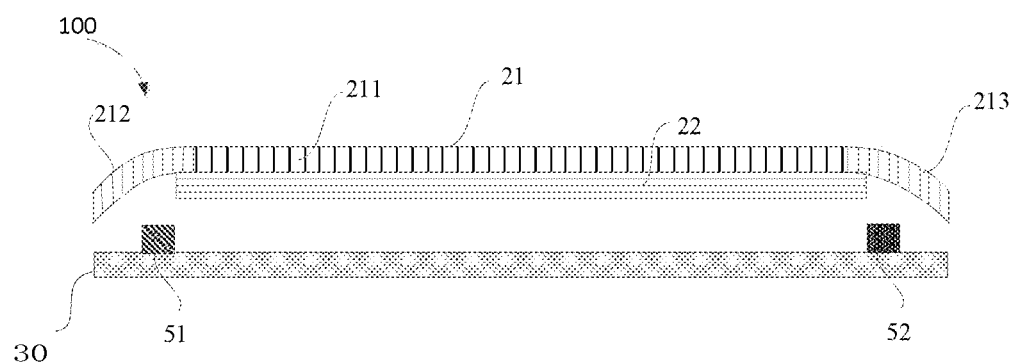
FIG. 3 is a sectional view illustrating a variant of the electronic device in FIG. 2.
Figure 4:
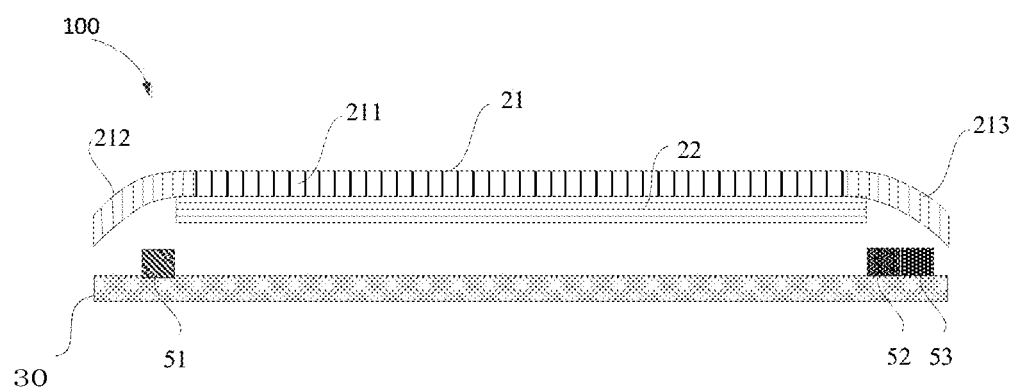
FIG. 4 is a sectional view illustrating another variant of the electronic device in FIG. 2.

In the embodiments as illustrated in FIGS. 3 and 4, the light shield layer 22 is only arranged opposite to, specifically below the straight portion 211 of the display screen 21, and thus the curved portion of the display screen 21 will not be blocked. In this case, the light shield layer 22 does not need to be provided with an opening.

Figure 8:
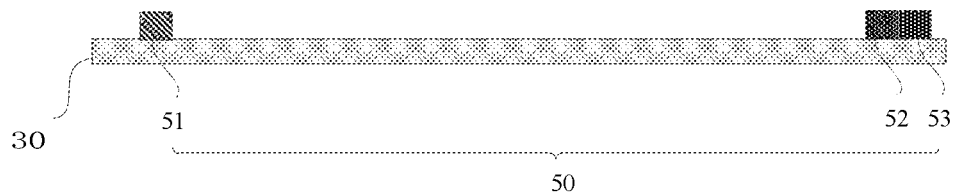
FIG. 8 is a sectional view of a sensor component and a circuit board according to another embodiment of the present disclosure.

In embodiments as illustrated in FIG. 4 and FIG. 8, the above sensor component 50 may further include an ambient-light sensor 53, and the ambient-light sensor 53 may be arranged adjacent to the signal emitter 52. The ambient-light sensor 53 is used to detect a density of an ambient light. The electronic device 100 can adjust a brightness of the display screen 21 according to the density of the ambient light detected by the ambient-light sensor 53.

Figure 5:
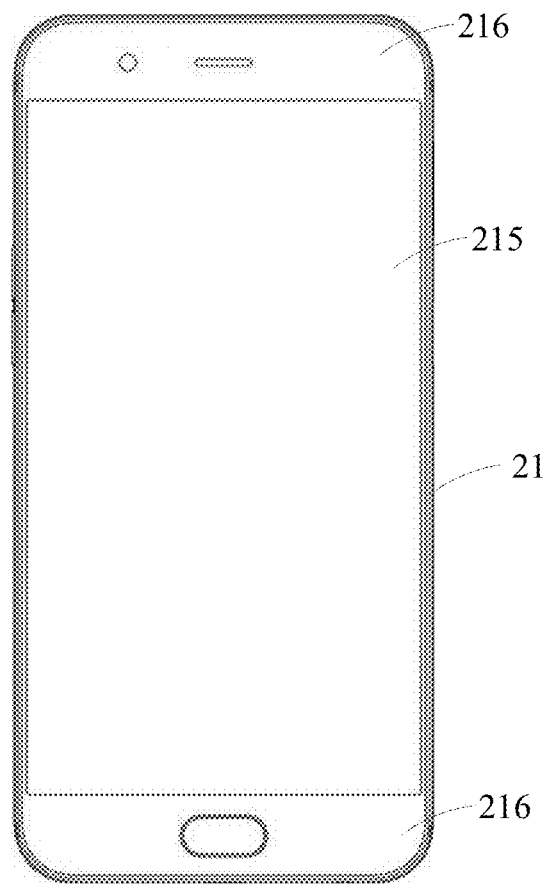
FIG. 5 is another schematic view of the electronic device in FIG. 1, in which the display screen is illustrated in details.

In embodiments as illustrated in FIG. 5, the display screen 21 includes a display area 215 and a non-display area 216. The display area 215 executes a display function of the display screen 21, so as to display information. The non-display area 216 does not display information. The display screen 21 may include a plurality of non-display areas 216 spaced apart from one another. For example, the non-display area 216 is provided at each of a top and a bottom of the display screen 21. The non-display area 216 may be used to receive functional components, such as a camera, a telephone receiver and a fingerprint module.

In the description of the present disclosure, "a plurality of" means two or more than two, unless specified otherwise.

The first opening 221 and the second opening 222 of the light shield layer 22 are both arranged at the display area 215. With the first opening 221 and the second opening 222, the sensor component 50 can achieve a function of proximity sensing for the electronic device 100, such that there is no need to provide an opening and a proximity sensor in the non-display area of the display screen 21 additionally.

In some embodiments, the first opening 221 and the second opening 222 each is a round hole, and each of the first opening 221 and the second opening 222 may have a diameter of 2-6 millimeters. In other embodiments, the opening may be a square hole, an elliptical hole or a hole having another shape.

In the embodiments as illustrated in FIG. 6, the light shield layer 22 includes a first light shield layer 223 and a second light shield layer 224. The first light shield layer 223 is coupled to a side of the display screen 21 facing the sensor component 50, and the second light shield layer 224 is coupled to a side of the first light shield layer 223 facing the sensor component 50. The second light shield layer 224 includes the first opening 221 and the second opening 222, the first opening 221 corresponds to the signal receiver 51, and the second opening 222 corresponds to the signal emitter 52. The first light shield layer 223 covers the first opening 221 and the second opening 222 in the second light shield layer 224, such that the first opening 221 and the second opening 222 are hidden and invisible from an appearance of the display screen 21.

It may be understood that the number of the first light shield layers 223 included in the light shield layer 22 can be set according to actual requirements, for example, one, two or three. In this embodiment, one first light shield layer 223 is taken as an example to describe the electronic device 100 of the present disclosure. In other embodiments, three first light shield layers 223 may be provided.

A transmissivity of the first light shield layer 223 is larger than a transmissivity of the second light shield layer 224.

For example, the transmissivity of the first light shield layer 223 may be 80% or more than 80%, and the transmissivity of the second light shield layer 224 may be 10% or less than 10%. In practical applications, the first light shield layer 223 may be referred as a transmission layer for transmitting most lights, and the second light shield layer 224 may be referred as a block layer for blocking most lights.

The second light shield layer 224 may block external ambient lights or lights inside the mobile electronic device 100, so as to achieve an effect of covering the structures inside the mobile electronic device 100, thus making the appearance of the electronic device 100 artistic. The second light shield layer 224 may have a black or gray ink, as long as the transmissivity of the second light shield layer 224 is less than the transmissivity of the first light shield layer 223, and specific situations can be set according to actual requirements. In these embodiments, the first light shield layer 223 may be a white ink layer, and the second light shield layer 224 may be a black ink layer.

In these embodiments of the present disclosure, since only the second light shield layer 224 has the opening, and the first light shield layer 223 does not have the opening, the layout design and the manufacturing process of the panel can be simplified. Thus, with respect to the prior art, the manufacturing process of the smart terminal is simplified and the expressiveness of the appearance of the electronic device 100 is greatly improved.

In these embodiments, during the proximity sensing, the signal emitter 52 generates the infrared light, the infrared light passes through the second opening 222 and the first light shield layer 223 and is transmitted to the outside, the infrared light is reflected to the display screen 21 when encountering a blocking object, and then the infrared light is further reflected by the display screen 21 to the blocking object, such that the infrared light passes through the first light shield layer 223 and the first opening 221 to be received by the signal receiver 51 after being reflected by the display screen 21 and the blocking object in this way.

In the embodiments as illustrated in FIG. 7, for convenience of assembling, the sensor component 50 may be first manufactured separately, which includes the signal emitter 52 and the signal receiver 51 coupled to the circuit board 30. The signal emitter 52 and the signal receiver 51 are spaced apart from each other, and a distance d between the geometric center of the signal emitter 52 and the geometric center of the signal receiver 51 is substantially equal to the width of the electronic device. The signal emitter 52 and the signal receiver 51 may be packaged into a first chip.

In some embodiments, when the signal emitter 52 and the signal receiver 51 are arranged to correspond to the first curved portion 212 or the second curved portion 213 respectively, the signal emitter 52 and the signal receiver 51 may be arranged adjacent to each other, thus reducing a volume of the first chip.

In the embodiments as illustrated in FIG. 8, the sensor component 50 includes the signal emitter 52, the signal receiver 51 and the ambient-light sensor 53. The ambient-light sensor 53 is used to detect the density of the ambient light. The electronic device 100 can adjust the brightness of the display screen 21 according to the density of the ambient light detected by the ambient-light sensor 53.

The signal emitter 52 is spaced apart from the signal receiver 51. The signal emitter 52 is arranged adjacent to the ambient-light sensor 53.

In some embodiments, the signal emitter 52, the signal receiver 51 and the ambient-light sensor 53 may be packaged into a second chip.

In conclusion, the present disclosure provides the electronic device, and the electronic device includes the display screen as well as the light shield layer, the sensor component and the circuit board disposed at the side of the display screen. The light shield layer is arranged between the display screen and the sensor component, and the sensor component is coupled to the circuit board. The display screen includes the straight portion and the curved portions at both sides thereof, and the sensor component has the position corresponding to the curved portion of the display screen. The sensor component includes the signal emitter and the signal receiver. The signal emitter is configured to emit the detecting signal to outside, the detecting signal is changed into the reflected signal after being reflected by the external object, and the signal receiver is configured to receive the reflected signal. Since the distance sensor is arranged in the side curved portion of the display screen, a space in the front panel of the terminal does not need to be occupied, thus reducing a usage of space resources in the front panel of the electronic device, and hence saving a hardware cost and a manufacturing procedure.

Although the present disclosure has been described with reference to one or more implementations, it will be appreciated by those skilled in the art that the disclosure includes equivalent modifications and changes that occur to those skilled in the art by reading and understanding the description and drawings. The present disclosure includes all the modifications and changes and is defined by impending claims. Specifically, regarding to various functions executed by above components (such as elements and resources, etc.), if it is not contrarily defined, terms for describing these components corresponds to any component for performing a certain function of the components (for example, they are equivalent in terms of the function), even though it is not equivalent to a disclosed structure of the functions in example embodiments of the present disclosure. In addition, although a certain feature of the present disclosure is disclosed relative to only one of several implementations, this feature may be combined to a desired or advantageous implementation regarding to a given or a certain application. Furthermore, regarding to the wording "comprise", "have", "contain" or the modifications thereof used in a detailed description or claims, these terms are similar to the wording "include".

The above is the detailed introduction of the display panel and the electronic device according to embodiments of the present disclosure, the principle and the implementation mode of the present disclosure are elaborated by means of specific examples, and the illustration for the above embodiments are merely used to understand the present disclosure. Meanwhile, the specific embodiments and the applied ranges can be changed for those skilled in the art according to the concept of the present disclosure. In general, the content of the present specification should not be construed to limit the present disclosure.

What is claimed is:

1. An electronic device, comprising:
    a display screen having a straight portion and a curved portion extending from a side of the straight portion;
    a sensor component arranged opposite to the display screen and having a position corresponding to the curved portion of the display screen; and
    a light shield layer arranged at a side of the display screen facing the sensor component;
    wherein the sensor component comprises a signal emitter and a signal receiver communicated with the signal emitter;
    wherein the light shield layer has a first opening and a second opening, the first opening corresponds to the signal emitter, and the second opening corresponds to the signal receiver;
    wherein the display screen comprises a display area configured to display information, and the first opening and the second opening of the light shield layer are arranged at the display area.

2. The electronic device according to claim 1, wherein the curved portion of the display screen comprises a first curved portion and a second curved portion, the signal emitter has a position corresponding to the second curved portion and the signal receiver has a position corresponding to the first curved portion.

3. The electronic device according to claim 1, wherein the signal emitter and the signal receiver are packaged into a chip.

4. The electronic device according to claim 1, wherein the sensor component further comprises an ambient-light sensor configured to detect an ambient-light intensity,
wherein the signal emitter, the signal receiver and the ambient-light sensor are packaged into a chip.

5. The electronic device according to claim 1, wherein the first opening and the second opening each are a round hole and have a diameter of 2-6 millimeters.

6. The electronic device according to claim 1, wherein the light shield layer comprises:
a first light shield layer coupled to a side of the display screen facing the sensor component; and
a second light shield layer coupled to a side of the first light shield layer facing the sensor component,
wherein the second light shield layer has the first opening and the second opening, and the first light shield layer covers the first opening and the second opening of the second light shield layer.

7. The electronic device according to claim 6, wherein the first light shield layer is a white ink layer, and the second light shield layer is a black ink layer.

8. The electronic device according to claim 6, wherein a transmissivity of the first light shield layer is larger than that of the second light shield layer.

9. An electronic device, comprising:
a display screen having a straight portion and two curved portions extending from two sides of the straight portion respectively; and
a sensor component arranged opposite to the display screen and comprising a signal emitter and a signal receiver communicated with the signal emitter,
wherein the signal emitter is configured to emit a detecting signal to outside through one of the two curved portions and the signal receiver is configured to receive a reflected signal from the outside through the other one of the two portions, in which the detecting signal is reflected into the reflected signal when touching an external object,
wherein the electronic device further comprises a light shield layer disposed at a side of the display screen facing the sensor component, and arranged opposite to the straight portion of the display screen without blocking the two curved portions of the display screen,
wherein the two curved portions of the display screen comprise a first curved portion and a second curved portion, the signal emitter has a position corresponding to the second curved portion and the signal receiver has a position corresponding to the first curved portion.

10. The electronic device according to claim 9, wherein the signal emitter and the signal receiver are packaged into a chip.

11. The electronic device according to claim 9, wherein the sensor component further comprises an ambient-light sensor configured to detect an ambient-light intensity,
wherein the signal emitter, the signal receiver and the ambient-light sensor are packaged into a chip.

12. An electronic device, comprising:
a housing;
a display screen coupled to the housing, having a straight portion and a curved portion extending from a side of the straight portion;
a circuit board received in the housing and disposed at a side of the display screen;
a sensor component coupled to the circuit board and arranged opposite to the curved portion of the display screen, the sensor component comprising a signal emitter and a signal receiver; and
a light shield layer arranged between the display screen and the sensor component;
wherein the light shield layer comprises:
a first light shield layer coupled to a side of the display screen facing the sensor component; and
a second light shield layer coupled to a side of the first light shield layer facing the sensor component;
wherein the second light shield layer has a first opening and a second opening, the first opening is opposite to the signal emitter, the second opening is opposite to the signal receiver, and the first light shield layer covers the first opening and the second opening of the second light shield layer.

13. The electronic device according to claim 12, wherein the curved portion of the display screen comprises a first curved portion and a second curved portion, the signal emitter is arranged opposite to the second curved portion and the signal receiver is arranged opposite to the first curved portion.

* * * * *